Feb. 29, 1944. W. W. MEYER 2,342,955
SEAL
Filed April 27, 1942
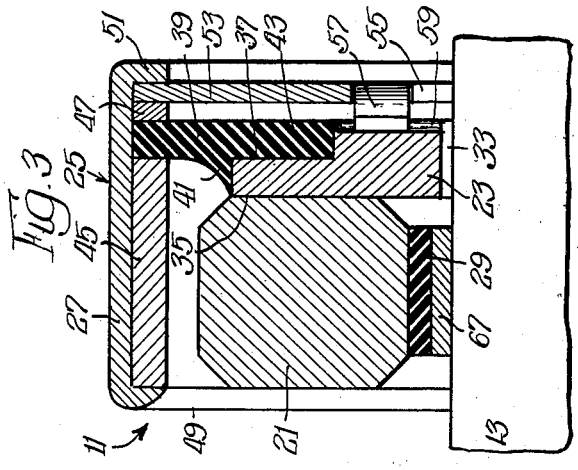
INVENTOR:
Walter W. Meyer,
BY:
Spencer, Marzall, Johnston & Cook.
attys.

Patented Feb. 29, 1944

2,342,955

UNITED STATES PATENT OFFICE 2,342,955

SEAL

Walter W. Meyer, Arlington Heights, Ill., assignor to Rotary Seal Company, Chicago, Ill., a corporation of Illinois Application April 27, 1942, Serial No. 440,621

4 Claims. (Cl. 286—11)

This invention relates in general to seals and sealing and has more particular reference to the sealing of rotating members, such as shafts, pipes and the like, generally designated as arbors, for the prevention of the escape of fluid along the arbor through a wall opening or journal in which the arbor extends.

An important object of the present invention is to provide a self-contained seal unit, including sealing elements assembled in a shell or casing, whereby the unit may be manufactured and merchandised as an integrated unit ready for assembly in sealing position on a shaft or arbor.

Another important object is to provide a seal unit of inexpensive construction made of metal parts of simple form.

Another important object is to provide a seal of the character mentioned, having considerable flexibility, in order to accommodate inaccuracies of alignment in the shaft on which it is used.

Another important object is to provide a seal of the character mentioned, having a seal ring adapted for sealed connection on the shaft merely by sliding the casing of the unit which contains the ring upon the shaft, the ring being provided with internal shaft-gripping means secured upon the inner shaft-engaging surfaces of the ring; a further object being to form a shaft-gripping layer of rubberlike material upon the inner shaft-embracing surfaces of a seal ring.

A still further important object is to provide a seal unit of the character mentioned, having a seat forming member yieldingly mounted in the casing of the unit; a further object being to support the seat forming member in the casing by attaching it centrally on a diaphragm of rubberlike material, the peripheral edges of which are sealingly secured in the casing.

Still another important object is to provide a seal unit including a shaft-gripping ring and a yieldingly mounted seat forming element within a casing of simplified construction, including yielding means forming a part of the casing for holding the seal ring against the seat forming element whereby to form a running seal therebetween when the unit is in operating position applied to a shaft.

Another important object is to provide interengaging means on the seat forming element and on the casing to prevent undue tension in the resilient seat supporting web when the seal is in operation.

These and numerous other important objects, advantages, and inherent functions of the invention will be fully understood from the following description, which, taken in connection with the accompanying drawing, discloses a preferred embodiment of the invention.

Referring to the drawing:

Figure 1 is a sectional view taken along a seal embodying the present invention, the seal being shown in operating position on a shaft to be sealed;

Figure 2 is an enlarged sectional view of the seal shown in Figure 1;

Figure 3 is an enlarged sectional view of a modified form of the seal;

Figure 4 is a sectional view taken substantially along the line 4—4 in Figure 2; and Figure 5 is a perspective view of the several seal parts.

To illustrate the invention, I have shown on the drawing a seal 11 for use on a shaft or arbor member 13, in order to seal the same against leakage along the shaft through an opening 15 in a wall 17 through which the shaft or arbor member extends.

The shaft or arbor member to be sealed is usually solid and has cylindrical outer surfaces. It may, however, be a hollow pipe and the term "shaft" or "arbor" includes hollow pipe as well as solid shafting. The device of my present invention, furthermore, is adapted to seal the space 15 between the arbor and the wall through which it extends, whether the wall rotates on the stationary arbor or whether the arbor rotates with respect to a stationary wall.

The seal of my present invention is particularly adapted for use as an oil seal ring and may be applied to the shaft or arbor adjacent a roller bearing 19 mounted in the opening 15 for the support of the shaft or arbor turnably with respect to the wall 17. To this end, the seal 11, as shown in the drawing, comprises a seal ring 21 and a seat forming member 23 enclosed within a casing 25 whereby the seal comprises a complete unit. Casing 25 preferably comprises a cylindrical shell 27 within which the seal ring 21 and the seat forming member 23 are permanently assembled and confined.

The seal ring 21 comprises an annular member of bearing material, such as steel, carbon, bronze or other suitable material, having a layer of rubberlike sealing material 29 formed on the inner surface 31 of the ring, the ring being sized to snugly receive the shaft 13 when the seal is in place thereon and thus compress the layer 29 between the shaft and the ring. The layer 29 preferably comprises neoprene, a synthetic rubber, and it is bonded to the ring 21 by means of heat and pressure and thus firmly secured in place on the ring. If desired, the surface 31 may be grooved or otherwise roughened to aid in bonding the layer 29 on the ring 21.

The seat forming member 23 comprises an annular plate having a central opening 33 sized to loosely receive the shaft 13 therethrough so that the shaft is freely turnable within the central opening of the annular plate which has a surface 35 facing and engaging the ring 21 and forming a seal seat against which the seal ring may form a running seal. The member 23 also is preferably cut away, as at 37, on its surface remote from its seal seating surface whereby it may be fastened eccentrically on a web or diaphragm 39 comprising a sheet of resilient, rubberlike material, such as neoprene.

The member 39 is formed on and adhered to the peripheral portions of the member 23, as by heat and pressure, the member 39 preferably having a filleted portion 41 overlying the peripheral edge of the member 23 and a web portion 43 extending in the cutout portion 37 on the back of the member 23. If desired, the surfaces of the member 23 to which the member 39 is adhered may be grooved or otherwise roughened to improve the bond between the members. The marginal edge of the member 39 extends snugly within the cylindrical casing member 27 and is held in place therein by a clamping sleeve 45 and a spacing ring 47, which are secured by and within the member 27 in position clampingly securing the peripheral edge of the member 39 between the members 45 and 47, the parts being secured in place within the casing member 27 by peening and flanging the opposite edges of the member 27, as shown respectively at 49 and 51. The flange 51 also embraces and holds in place in the seal casing an end plate 53 of resilient material, such as steel, said plate 53 being formed with a central opening 55 through which the shaft may extend in freely turnable fashion. The plate 53 overlies and thus protects the flexible web 39 and is formed at intervals with outstruck tines or teeth 57 which are inclined inwardly and which engage the back of the said forming member 53 whereby to resiliently support said seat member on the tines 57.

The surface of the member 23, in engagement with the tines, is formed with radial grooves or serrations 59 into which the tines 57 may extend, whereby to hold the member 23 against any relative rotational impulse with respect to the casing which might be imparted due to the rotation of the ring 21 against the seal seat 35. The tines 57 thus not only yieldingly support the member 23 in an axial direction, but also, in tending to prevent rotation of the member 23 in the casing, protect the web 39 against undue torsional strain.

The peened portion 49 of the casing supports an end cover plate 61 having a central opening 63 through which the shaft may extend in freely rotatable fashion; and this end plate 61 is formed with an inwardly offset annular groove 65 in position to form a bearing surface for a side of the ring 21 remote from the side thereof which engages the seal seat 35. It will thus be seen that the seal ring 21 and the member 23 are yieldingly pressed together between the cover plates 53 and 61; that the seal ring 21 is sealingly gripped upon the shaft 13 by virtue of the rubberlike layer 29, while the seat forming member 23 is yieldingly supported and sealed in the casing by means of the web 39. When the casing is press-fitted in the opening 15 adjacent the bearing 19, leakage through the opening 15 beyond the bearing will be prevented, since the ring 21 is sealed to the shaft, the said element 23 is sealed to the web, which in turn is sealed to the casing, the casing being press-fitted in leakproof fashion within the opening 15; and the rotation of the ring 21 against the seal seat 35 provides a running seal preventing the escape of fluid between the ring 21 and the said member 23.

As shown in Figure 3 of the drawing, a metal ring 67 may be provided within the annular layer 29 of resilient material, the material of the layer 29 being adhered firmly on the ring 67 by means of heat and pressure, preferably applied during the formation of the layer 29 on the seal ring 21.

The metal ring 67 is sized for press-fitted assembly on the shaft 13, where the shaft-mounted ring is arranged as shown in Figure 3; the end wall 61 may be omitted, if desired, since the ring 21 will be retained in place on the shaft by virtue of the tight, press-fitted grip of the mounting ring 67 on the shaft. If desired, the outer surface of the ring 67 may be grooved or otherwise roughened to improve adherence of the layer 29 thereon.

It is thought that the invention and its numerous attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A seal for application in a wall opening around an arbor extending in the opening, comprising means forming an annular casing adapted to encircle the arbor and sized for snug press-fitted assembly in the wall opening, an annular web of flexible material having a central opening and sealed at its peripheral edge in said casing, an annular plate sealingly secured on said web at said opening in position girdling the arbor, said plate forming an annular seal seat around the arbor, means forming an end cover on said casing in position overlying said web, resilient means supporting said annular plate on said cover, a seal ring having an annular surface adapted to engage and form a running seal with said seat, means to mount said ring resiliently and seal the same on said arbor, said last mentioned means comprising a resilient, rubberlike layer adhered on the inwardly facing surface of said ring and a metal mounting sized for press-fitted assembly on the arbor, said mounting extending within and being adhered to said layer.

2. A seal for application in a wall opening around an arbor extending in the opening, comprising means forming an annular casing adapted to encircle the arbor and sized for snug press-fitted assembly in the wall opening, an annular web of flexible material having a central opening and sealed at its peripheral edge in said casing, an annular plate sealingly secured on said web at said opening in position girdling the arbor, said plate forming an annular seal seat around the arbor, means forming an end cover on said casing in position overlying said web, resilient means supporting said annular plate on said cover, said resilient means comprising tongues struck from said cover and bearing upon the face of said annular plate remote from said seal seat, a seal ring having an annular surface adapted to engage and form a running seal with said seat, and means to mount said ring resiliently and seal the same on said arbor.

3. A seal for application in a wall opening around an arbor extending in the opening, comprising means forming an annular casing adapted to encircle the arbor and sized for snug press-fitted assembly in the wall opening, an annular web of flexible material having a central opening and sealed at its peripheral edge in said casing, an annular plate sealingly secured on said web at said opening in position girdling the arbor, said plate forming an annular seal seat around the arbor, means forming an end cover on said casing in position overlying said web, resilient means supporting said annular plate on said cover, said resilient means comprising tongues struck from said cover and bearing upon the face of said annular plate remote from said seal seat, said face being formed with radial grooves to receive said tongues, a seal ring having an annular surface adapted to engage and form a running seal with said seat, and means to mount said ring resiliently and seal the same on said arbor.

4. A seal for application in a wall opening around an arbor extending in the opening, comprising means forming an annular casing adapted to encircle the arbor and sized for snug press-fitted assembly in the wall opening, an annular web of flexible material having a central opening and sealed at its peripheral edge in said casing, an annular plate sealingly secured on said web at said opening in position girdling the arbor, said plate forming an annular seal seat around the arbor, means forming an end cover on said casing in position overlying said web, resilient means supporting said annular plate on said cover, a seal ring having an annular surface adapted to engage and form a running seal with said seat, and means to mount said ring resiliently and seal the same on said arbor, said ring having an inwardly facing annular surface adapted to embrace said arbor, an annular layer of rubberlike material adhered on said inwardly facing surface and a metal mounting sized for press-fitted assembly on the arbor, said mounting ring extending within and being adhered to said annular layer.

WALTER W. MEYER.